Dec. 21, 1965 A. F. NYSTROM 3,224,533

OPENING FRAME AND CLIP THEREFOR

Filed Dec. 31, 1962 2 Sheets-Sheet 1

Inventor
Albert F. Nystrom
By Merriam, Smith & Marshall
Attorneys

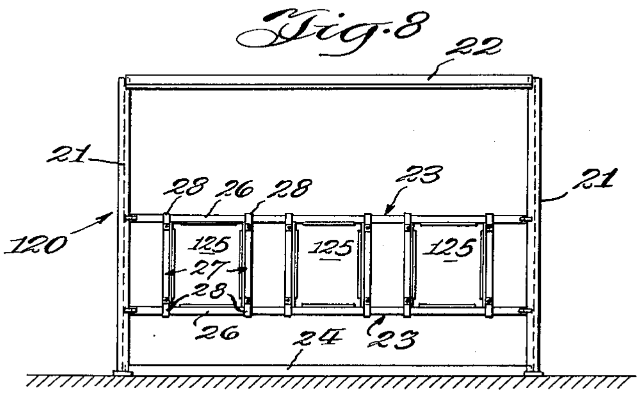
Fig. 10
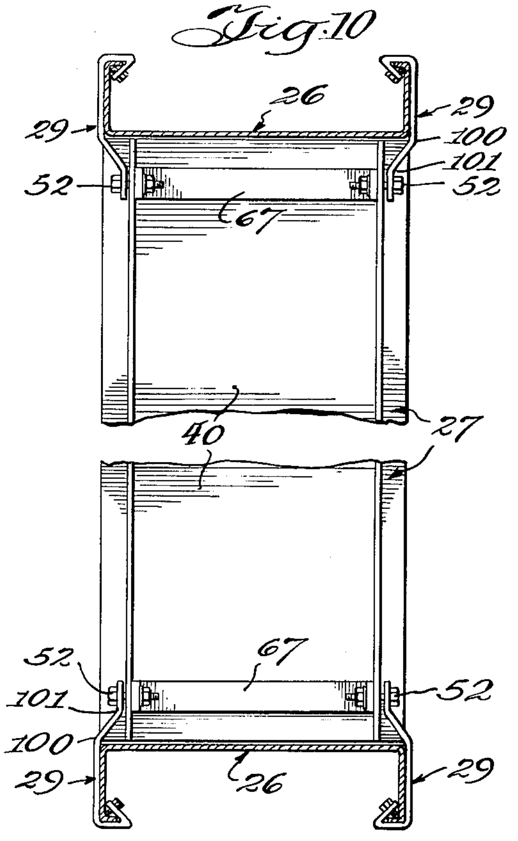
Fig. 9
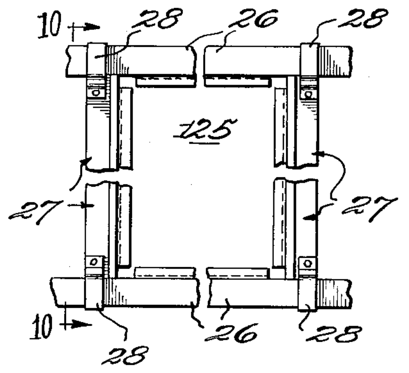
Inventor
Albert F. Nystrom
By Merriam, Smith & Marshall
Attorneys 3,224,533

OPENING FRAME AND CLIP THEREFOR

Albert F. Nystrom, Brookfield, Wis., assignor to Inland Steel Products Company, Milwaukee, Wis., a corporation of Delaware Filed Dec. 31, 1962, Ser. No. 248,675

14 Claims. (Cl. 189—35)

The present invention relates generally to metal building frames, and more particularly to frames for door or window openings in the building and to clips used to position and engage the frame components.

The frame for an opening in a metal building is typically composed of a pair of horizontal members or components and a pair of vertical members. The horizontal members usually extend between posts in the wall of the building, and the vertical members usually have opposite ends thereof each attached to one of the horizontal components of the opening frame. In conventional construction of opening frames, the vertical components of the frame are usually positioned at a desired location along the length of the horizontal component, holes are shop or field drilled in the horizontal and vertical components, and the vertical and horizontal components are attached together with bolts, screws, rivets or the like. Conventional construction of the type just described requires precision positioning of the vertical components along the length of the horizontal components, and requires vertical plumbing of the vertical components, all of which is relatively time consuming and requires considerable skill.

In accordance with the present invention, an opening frame is provided which enables maximum flexibility in locating openings, allows precision positioning of the vertical components with minimum effort, and eliminates shop or field drillings of holes in the horizontal components of the frame.

The opening frame of the present invention includes a clip having a hanger portion, and means mounting the clip for slidable movement along the horizontal member. A manually tightenable connection is provided between the clip hanger portion and the vertical member, adjacent that end of the vertical member which terminates at the horizontal member. This connection includes means mounting the vertical member for rotation about an axis perpendicular to the plane of the building opening. A space is provided between the terminal end of the vertical member and the adjacent horizontal member for accommodating said rotation.

To locate the vertical member in a desired position relative to the horizontal member, one need merely slide the clip, and the vertical member attached thereto, along the length of the horizontal member to the desired position. Further sliding movement of the clip along the horizontal member, away from the desired position, is prevented by manually tightenable means for holding the clip against such movement.

To obtain the desired vertical plumbing of the vertical member one need merely rotate the vertical member about an axis perpendicular to the plane of the opening, at said connection, with the space between the terminal end of the vertical member and the horizontal member accommodating said rotation; and then, when the desired vertical angular disposition is obtained, the connection is tightened to prevent further rotation about said axis.

An opening frame including clips of the type described above may be utilized to provide frames for service door openings, overhead door openings, window openings, and the like.

Other features and advantages of the invention are inherent in the structure claimed and disclosed or will become apparent to those skilled in the art from the following detailed description in conjunction with the accompanying diagrammatic drawings wherein:

FIGURE 8 is a front elevational view, similar to FIGURES 1 and 5, of a portion of a metal building frame including frames for window openings;

FIGURE 9 is an enlarged fragmentary view of a window opening frame illustrated in FIGURE 8; and FIGURE 10 is a sectional view taken along line 10—10 in FIGURE 9.

Figures 1, 2, 3, 5, 6, 7:
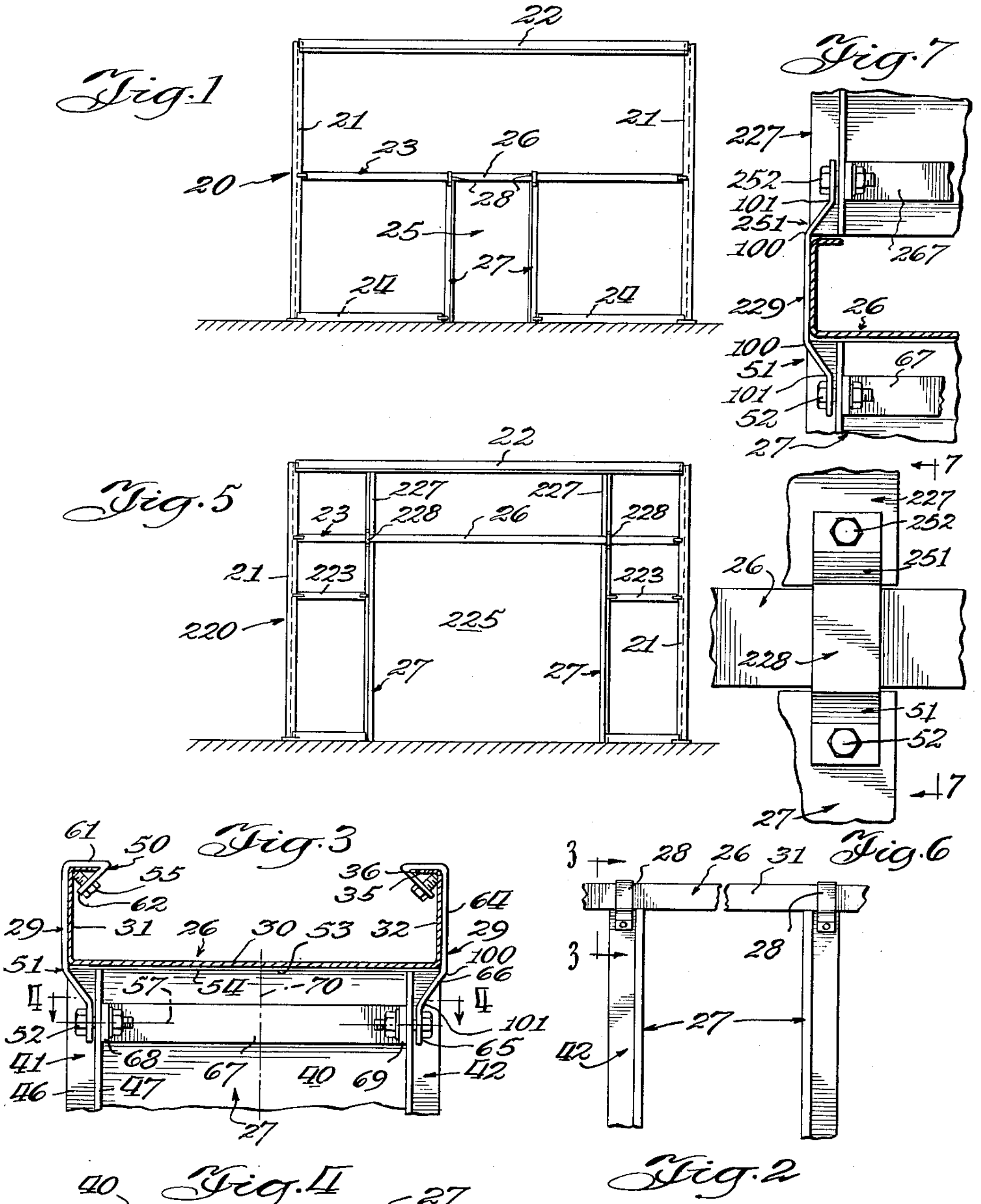
FIGURE 1 is a front elevational view of a portion of a building frame including a frame for a service door opening.
FIGURE 2 is an enlarged fragmentary view, similar to FIGURE 1, of the frame opening.
FIGURE 3 is a sectional view taken along line 3—3 in FIGURE 2.
FIGURE 5 is a front elevational view, similar to FIGURE 1, illustrating a portion of a building frame including a frame for an overhead door opening.
FIGURE 6 is an enlarged fragmentary view illustrating an embodiment of a clip utilized in the frame opening of FIGURE 5.
FIGURE 7 is a sectional view taken along line 7—7 in FIGURE 6.

Referring initially to FIGURE 1 there is illustrated a wall frame indicated generally at 20 and comprising a pair of posts 21, an eave member 22 having opposite ends each connected to a respective post at the top thereof, a girt 23 having opposite ends each connected to a respective post 21 between the top and bottom of a respective post, and base means 24 located along the bottom of the frame.

End wall frame 20 also includes a service door opening 25 defined by frame components including a horizontal or first member or header 26 (constituting a portion of girt 23) and vertical or second members or jambs 27, said vertical members being connected to horizontal member 26 by clip means 28 to be described in detail subsequently.

Referring to FIGURE 3, horizontal or first member 26 includes a web 30 and a pair of flanges 31, 32 extending upwardly from web 30 at respective opposite sides thereof. Each flange includes a terminal or stiffener portion 35 having a free edge 36.

Figure 4:
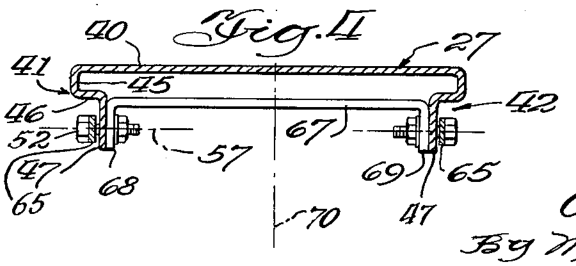
FIGURE 4 is a sectional view taken along line 4—4 in FIGURE 3.

Referring to FIGURES 3 and 4, the vertical or second member 27 includes a web 40 and a pair of flange means 41, 42 located at respective opposite sides of web 40. Referring to FIGURE 4, each flange means 41, 42 includes a first part 45 integral with web 40, a second part 46 extending from first part 45 in a direction parallel to web 40 and a third part 47 integral with part 46 and extending in a direction parallel to first part 45.

Referring to FIGURES 3 and 4, each clip means 28 includes a pair of clip elements 29 each connected to a respective flange 31 or 32 of the horizontal member 26 and to a respective flange 41 or 42 of a vertical member or jamb 27. Each clip element 29 includes a hook-like portion 50 for slidably engaging a flange and stiffener portion (e.g., 31 and 35) of first member 26, and a hanger portion 51 for connection to a flange (e.g., 41) of second member 27. Hanger portion 51 is connected to second member 27 near a terminal end 53 of the latter by means such as nut and bolt connection 52.

Hanger portion 51 is initially connected to a flange means of second member 27 by nut and bolt means at 52, and hook-like portion 50 is slidably engaged at the terminal edge 36 of a flange stiffener portion (e.g., 35)

of first member 26. Connection 52 and a securing means 55 on hook-like portion 50 are initially in a loose condition. Securing means 55 is shown as a threaded member in the illustrated embodiment. The purpose of said securing means is to bind clip element 29 to flange 31 when the clip element has been slidably adjusted to the desired position. Thus the securing means could be a conventional binding element other than threaded member illustrated in the drawings (e.g., a wedge).

Terminal end 53 of second member 27 is separated from web 30 of first member 26 by a space 54. When its securing means 55 is in a condition which allows movement of the associated clip element 29, the latter is slidably moved, together with the vertical member 27 to which the clip element 29 is connected, along the length of first member 26 until the desired position along member 26 is attained. Then securing means 55 is adjusted to bind clip element 29 against further slidable movement along first member 26.

To obtain the desired vertical plumbing of second member 27, the latter is rotated about the axis 57 of connection 52, said axis extending perpendicular to the plane 70 of opening 25, until the desired vertical angular disposition (e.g., perpendicular to member 26) is obtained. Then the nut and bolt connection 52 is tightened to secure member 27 against further rotation about axis 57.

Describing clip element 29 in greater detail, hook-like portion 50 includes a first part 61 extending in a direction parallel to web 30 of member 26 and toward the center of web 30, and an angularly extending portion 62 integral with portion 61 and extending back toward the adjacent flange (e.g., 31) of member 26. Hanger portion 51 includes a first part 64 parallel to the adjacent flange (e.g., 32) on member 26, a second part 65 parallel to the adjacent flange portion (e.g., 47) on member 27, and a third part 66 extending angularly between part 64 and part 65. Because of this construction, and the construction of member 27, with its inwardly set flange portion 47, the outer extremity of connection 52 is located inwardly of part 64 and of a flange 31, 32 on member 26, and thus does not interfere with the attachment of wall panels to flange 31 or 32.

Each of the two clip elements 29 included in a single clip means 28 is connected by a rigid member 67 having opposite end portions 68, 69 through each of which extends a respective nut and bolt connection 52. Rigid member 67 facilitates slidable movement of second member 27 along first member 26 and prevents binding of a respective clip element 29 due to a possible tendency of member 27 to rotate about the vertical axis thereof at such time as a force, exerted against member 27 to slide it on member 26, is off-center relative to said vertical axes.

Member 67 also provides a binding, rigid connection between horizontal first member or header 26 and vertical second member or jamb 27, in the following manner. Tightening of nut and bolt connection 52 causes tension to develop in element 67 which, however, is constructed so that it will not stretch. On the other hand, clip element 29 is constructed so that it is relatively less resistant to deformation; and, as a result of the tensions exerted on stretch-resistant member 67, will bend at points 100 and 101 dividing parts 64, 66 and 66, 65 respectively. This causes vertical member 27 to be urged upwardly toward horizontal member 26, diminishing space 54 between web 30 on member 26 and terminal edge 53 on member 27. Connection 52 is tightened until terminal edge 53 is in abutting relation with web 30 to provide a binding engagement between members 26, 27 for holding member 27 against sliding movement relative to member 26.

Referring to FIGURES 8 through 10, there is illustrated a wall frame 120 including a plurality of window openings 125 each having a frame defined by a pair of horizontal or first members 26 and a pair of vertical or second members 27, said members being connected together by clip means 28, identical to those illustrated in FIGURES 1 through 4. The only essential difference between the structure illustrated in FIGURES 1 through 4 and the structure illustrated in FIGURES 8 through 10 is that each vertical member 27 has clip means 28 at both the top and bottom thereof so as to connect the vertical member 27 to each of the two horizontal members 26, 26 rather than to only one horizontal member 26 as illustrated in FIGURES 1 through 4.

Referring to FIGURES 5 through 7 there is illustrated a wall frame 220 including an overhead or large door opening 225 defined by a first or horizontal member door header 26 and a pair of vertical or second members or door jambs 27. End wall frame 220 also includes a pair of girt portions 223 extending between posts 21 and second members or door jambs 27, and door jamb extensions 227 constituting vertical continuations of jamb members 27. The components 26, 27 of doorway 225 are connected together by clip means 228 each of which also constitutes a connection for a respective jamb extension as will be described in detail.

Each clip means 228 includes a pair of clip elements 229 connected together in a manner similar to the connection between the two clip elements 29 in clip means 28 illustrated in FIGURES 1 through 4. The significant difference between clip element 29 of FIGURES 1 through 4 and clip element 229 of FIGURES 5 through 7 is that, instead of having a hook-like portion 50 for slidably engaging a flange on member 26, as in clip element 29, the clip elements 229 have a second hanger portion 251 for connection to the jamb extension 227.

Jamb extension 227 has the same cross-sectional configuration as the jamb or second member 27, and the connection of second hook portion 251 to jamb extension 227 is the same as the connection of hook portion 51 to member 27.

Utilizing clip means 228 enables the positioning and alignment of jamb extension 227 as well as jamb 27. Both members 27 and 227 are slidable relative to horizontal member 26 because of their attachment to clip element 229, itself slidably movable along the length of member 26. Both members 27, 227 are vertically alignable because each may be rotated about the axis of a respective connection 52, 252 until the desired vertical disposition is obtained, whereupon the connections 52, 252 are tightened to hold the members 27, 227 in the desired angular disposition. Rigid stretch-resistant members 67, 267 perform the same function as member 67 in the embodiment illustrated in FIGURES 1 through 4, and operate to cause binding between members 27, 227 and member 26 when connections 52, 252 are tightened.

The foregoing detailed description has been given for clearness of understanding only, and no unnecessary limitations should be understood therefrom, as modifications will be obvious to those skilled in the art.

What is claimed is:

1. In a frame for an opening:

a first elongated member;

a second elongated member, extending transversely to said first elongated member, and having a terminal end adjacent said first member;

each of said members defining a respective side of said opening;

a clip element including a hanger portion;

said clip element including means mounting the clip element for slidable movement along said first member;

a connection between said clip hanger portion and said second member adjacent said terminal end of the second member;

said connection including means mounting the second member for rotation about an axis perpendicular to the plane of said opening;

a space between the terminal end of said second member and said first member for accommodating said rotation and slidable movement of the second member relative to the first member;

means at said connection for securing said second member against rotation; and cooperating means at said connection and on said hanger portion for urging said terminal end of the second member into abutment with the first member to bind the second member against slidable movement.

2. In a frame as recited in claim 1 and comprising:

securing means for binding said clip element to said first member to hold said clip element against slidable movement along the first member.

3. In a frame for an opening:

a first elongated member;

a second elongated member, extending transversely to said first elongated member, and having a terminal end adjacent said first member;

each of said members defining a respective side of said opening;

a pair of clip elements each including a hanger portion;

each of said clip elements including means mounting the clip element for slidable movement longitudinally along a respective side of said first member, opposite the side along which the other of said clip elements is slidably mounted;

a pair of connections each between the hanger portion of a respective clip element and a respective side of said second member, opposite the side to which the hanger portion of the other clip element is connected;

each of said connections being adjacent said terminal end of the second member;

each connection including means mounting the second member about an axis common to both connections and perpendicular to the plane of said opening;

a space between the terminal end of said second member and said first member for accommodating said rotation and slidable movement of the second member relative to the first member;

means at said connections for securing said second member against rotation; and cooperating means at said connections and on said hanger portions for urging said terminal end of the second member into abutment with the first member to bind the second member against slidable movement.

4. In a frame as recited in claim 3 and comprising:

securing means for binding said clip element to said first member to hold the clip element against slidable movement along the first member.

5. In a frame as recited in claim 3 wherein said means at said connection includes:

a rigid relatively stretch-resistant member extending between said connections and having opposite ends each attached to a respective one of said connections.

6. In a frame for an opening:

a header having a horizontally disposed web and a vertically disposed flange extending from said web and terminating at a free edge;

a vertically disposed jamb having a web extending transversely to the plane of said building opening, and a flange extending from said jamb web parallel to the plane of said opening;

said jamb having a terminal end adjacent the web of said header and spaced therefrom;

a clip element including a hook portion engaging said free edge of the header flange and normally mounting said clip element for slidable movement along said header;

a clip hanger portion extending from said hook portion;

a connection between said clip hanger portion and the jamb flange, adjacent said terminal end of the jamb to render the jamb slidably movable with the clip element;

said connection including means normally mounting the jamb for rotation, at the connection, about an axis perpendicular to said plane of said opening;

means at said hook portion for securing said clip element against slidable movement on said header;

means at said connection for securing said jamb against rotation; and cooperating means at said connection and on said hanger portion for urging said terminal end of the jamb web into abutment with said web of the header to bind the jamb against slidable movement along the header.

7. In a frame as recited in claim 6 wherein:

said hanger portion includes a first part parallel to the flange of said header;

a second part parallel to the flange of said jamb;

and a third part, connecting said first and second parts, and extending angularly thereto;

said jamb flange being located inwardly of the header flange;

the outer extremity of said securing means at the connection being located inwardly of said header flange.

8. In a frame for an opening:

a header having a horizontally disposed web and a pair of vertically disposed flanges each extending from an opposite side of said web and terminating at a free edge;

a vertically disposed jamb having a web extending transversely to the plane of said building opening, and a pair of flanges each extending from an opposite side of said jamb web parallel to the plane of said opening;

said jamb having a terminal end adjacent the web of said header and spaced therefrom;

a pair of clip elements each including a hook portion engaging the free edge of a respective header flange and normally mounting said clip element for slidable movement along a respective side of said header;

each clip element having a hanger portion extending from said hook portion;

a pair of connections each between a respective clip hanger portion and a respective jamb flange, adjacent said terminal end of the jamb to render each jamb slidably movable with its respective clip element;

each connection including means normally mounting the jamb for rotation, at the connection, about an axis common to both connections and perpendicular to said plane of said opening;

means at each of said hook portions for securing said clip elements against slidable movement on said header;

means at said connections for securing said jamb against rotation; and cooperating means at said connections and on said hanger portions for urging the terminal end of said jamb into abutment with said web of the header to bind the jamb against slidable movement along the header.

9. In a frame as recited in claim 8 wherein said means at said connection comprises:

a rigid relatively stretch-resistant member extending between said connections and having opposite ends each attached to a respective one of said connections.

10. A clip for joining a pair of frame members, said clip comprising:

a pair of clip elements;

each clip element having a hook portion and a hanger portion;

said hook portion including means for slidably mounting said clip element on a first frame member;

means at said hook portion for securing said clip element against slidable movement on the first frame member;

tightenable connecting means on said hanger portion for connecting the hanger portion of a clip element to a second frame member disposed transversely to said first frame member and having a terminal end disposed adjacent the first frame member;

and rigid relatively unstretchable means, extending between said pair of clip elements, and having opposite ends each attached to a respective one of said connecting means;

said hanger portion including means, between said hook portion and said connecting means, which is relatively deformable in response to tightening of said connecting means;

said rigid means being relatively less deformable, in response to tightening of said connecting means, than said deformable means on the hanger portion.

11. A clip as recited in claim 10 wherein said hanger portion comprises:

a first part adjacent said hook portion;

and a second part adjacent said connecting means;

said relatively deformable means comprising a deformable third part extending angularly between and integral with said first and said second parts.

12. A clip for joining a pair of frame members, said clip comprising:

a pair of clip elements;

each clip element including a hanger portion and means for slidably mounting said clip element on a first frame member;

tightenable connecting means on said hanger portion for connecting the hanger portion of the clip element to a second frame member disposed transversely to said first frame member and having a terminal end disposed adjacent the first frame member;

and rigid relatively stretch-resistant means, extending between a pair of clip elements, and having opposite ends each attached to a respective one of said connecting means;

said hanger portion including means, between said slidable mounting means and said connecting means, which is relatively deformable in response to tightening of said connecting means;

said rigid means being relatively less deformable, in response to tightening of said connecting means, than said deformable means on the hanger portion.

13. A clip as recited in claim 12 wherein said hanger portion comprises:

a first part adjacent said slidable mounting means;

and a second part adjacent said connecting means;

said relatively deformable means comprising a deformable third part extending angularly between and integral with said first and second parts.

14. A clip as recited in claim 13 wherein each of said first, second and third parts of the hanger portion are composed of strip material.

References Cited by the Examiner

UNITED STATES PATENTS

| | | | |
|---|---|---|---|
| 927,724 | 7/1909 | Haynes | 189—36 X |
| 1,092,655 | 4/1914 | Louden | 189—36 X |

HARRISON R. MOSELEY, *Primary Examiner.*